United States Patent
Jumpertz

(10) Patent No.: US 10,762,788 B2
(45) Date of Patent: Sep. 1, 2020

(54) METHOD AND SYSTEM FOR REQUESTING AND GRANTING PRIORITY BETWEEN VEHICLES

(71) Applicant: Swoppz, LLC, Dover, DE (US)

(72) Inventor: Peter Jumpertz, Cologne (DE)

(73) Assignee: Swoppz, LLC, Dover, DE (US)

( * ) Notice: Subject to any disclaimer, the term of this patent is extended or adjusted under 35 U.S.C. 154(b) by 244 days.

(21) Appl. No.: 16/047,260

(22) Filed: Jul. 27, 2018

(65) Prior Publication Data

US 2019/0043364 A1  Feb. 7, 2019

Related U.S. Application Data

(60) Provisional application No. 62/539,589, filed on Aug. 1, 2017.

(51) Int. Cl.
*B60W 30/18* (2012.01)
*G06Q 20/22* (2012.01)
(Continued)

(52) U.S. Cl.
CPC ....... *G08G 1/167* (2013.01); *B60W 30/18163* (2013.01); *G01S 1/725* (2013.01); *G01S 5/30* (2013.01); *G01S 19/48* (2013.01); *G05D 1/0212* (2013.01); *G06Q 20/065* (2013.01); *G06Q 20/223* (2013.01); *G06Q 20/32* (2013.01); *G06Q 20/36* (2013.01); *G06Q 30/06* (2013.01); *G06Q 50/30* (2013.01); *G08G 1/0112* (2013.01); *G08G 1/04* (2013.01); *G08G 1/166* (2013.01); *B60W 2420/54* (2013.01); *B60W 2556/55* (2020.02);
(Continued)

(58) Field of Classification Search
CPC ........ B60W 30/18163; B60W 2556/65; G06Q 20/06; G06Q 20/22
See application file for complete search history.

(56) References Cited

U.S. PATENT DOCUMENTS

2008/0059050 A1  3/2008  Lin et al.
2010/0174651 A1  7/2010  Hogl
(Continued)

FOREIGN PATENT DOCUMENTS

WO  2010034317 A1  4/2010

OTHER PUBLICATIONS

International Searching Authority; ISA/US: International Search Report and Written Opinion in related PCT-Application PCT/IB2018/055721, dated Nov. 20, 2018.

*Primary Examiner* — Todd Melton
(74) *Attorney, Agent, or Firm* — Smartpat PLC

(57) ABSTRACT

The disclosure relates to a method for requesting and granting priority between a host vehicle and other vehicles, and to a system which implements the method. The host vehicle, through the use of on-board vehicle sensors, detects and identifies an impeding vehicle which interferes with the host vehicle's path. The host vehicle transmits a priority request to the impeding vehicle. The priority request includes a remuneration offer. The impeding vehicle evaluates the priority request, including the sufficiency of the host vehicle's remuneration offer, and grants or denies the host vehicle's priority request. If granted, the impeding vehicle modifies its path to be less impeding to the host vehicle, for example by assuming a cooperative path that lets the host vehicle pass the impeding vehicle.

19 Claims, 6 Drawing Sheets

(51) Int. Cl.

| | | |
|---|---|---|
| *G08G 1/16* | (2006.01) | |
| *G06Q 30/06* | (2012.01) | |
| *G06Q 50/30* | (2012.01) | |
| *G06Q 20/32* | (2012.01) | |
| *G06Q 20/36* | (2012.01) | |
| *G01S 19/48* | (2010.01) | |
| *G01S 1/72* | (2006.01) | |
| *G01S 5/30* | (2006.01) | |
| *G05D 1/02* | (2020.01) | |
| *G06Q 20/06* | (2012.01) | |
| *G08G 1/01* | (2006.01) | |
| *G08G 1/04* | (2006.01) | |
| *G05D 1/00* | (2006.01) | |
| *H04L 29/08* | (2006.01) | |

(52) U.S. Cl.
CPC ... *G05D 1/0088* (2013.01); *G05D 2201/0212* (2013.01); *H04L 67/12* (2013.01)

(56) References Cited

U.S. PATENT DOCUMENTS

| | | |
|---|---|---|
| 2010/0202346 A1 | 8/2010 | Sitzes et al. |
| 2011/0093159 A1 | 4/2011 | Boling et al. |
| 2013/0151412 A1* | 6/2013 | Spahl ............... G06Q 20/40 705/44 |
| 2015/0186844 A1 | 7/2015 | Trickel |
| 2017/0110011 A1 | 4/2017 | Tonguz et al. |
| 2017/0200368 A1* | 7/2017 | Le Vine ............ G06Q 20/223 |

* cited by examiner

Before / After

Before / After

Before / After

Before / After

METHOD AND SYSTEM FOR REQUESTING AND GRANTING PRIORITY BETWEEN VEHICLES

CROSS-REFERENCE TO RELATED APPLICATIONS

This application claims the benefit of U.S. Provisional Application Ser. No. 62/539,589, filed Aug. 1, 2017, which is hereby incorporated by reference in its entirety.

TECHNICAL FIELD

The subject disclosure relates to a method for requesting and granting priority between a host vehicle and other vehicles, and to a system which implements the method.

BACKGROUND

Traditionally, roads are part of a public infrastructure which is provided free of charge to all interested users. Road users include human drivers having different urgency of arriving at their destinations and who are traveling in vehicles of vastly different performance. Road use is regulated by common rules for all road users, such as speed limits, minimum speeds, no passing zones, etc. irrespective of individual travel needs.

In some instances, the use of roads is subject to paying a toll. The amount of the toll may vary depending on the time of the day and possibly on a present road utilization level to promote a more balanced road use. Until now, all attempts at more efficiently utilizing road infrastructure has been coarse, applying common rules to all road users independent of their individual needs.

The present disclosure provides a solution that allows vehicles traveling on the same road or intersecting roads to prioritize their respective road use and to exchange incentives, in particular monetary remuneration, in return for priority access to the road. The disclosed system so allows a more optimal use of available road infrastructure by prioritizing vehicles with more urgent travel needs over vehicles with less urgent travel needs.

SUMMARY

A method for requesting and granting priority between a host vehicle and other vehicles, includes the following steps:
1) Monitoring a host vehicle's environment via host vehicle sensors for objects and drivable surfaces in proximity of the host vehicle while the host vehicle is traveling along a host vehicle path.
2) Periodically transmitting host vehicle status messages including a host vehicle identity and a host vehicle position.
3) Receiving status messages from other vehicles.
4) Requesting priority from other vehicles and
5) responding to other vehicles' priority requests.

Requesting priority from other vehicles includes the following sub-steps:
  4a) Evaluating data from the host vehicle sensors to detect an impeding vehicle which interferes with the host vehicle's path.
  4b) Identifying the impeding vehicle by combining data contained in received vehicles status messages with data from the host vehicle sensors.
  4c) Transmitting a host vehicle priority request including a host remuneration offer to the impeding vehicle.
  4d) Receiving an impeding vehicle response which grants or denies the host vehicle priority request.

Responding to other vehicles' priority requests includes the following sub-steps:
  5a) Monitoring data from the host vehicle sensors for possible changes to the host vehicle path.
  5b) Receiving a priority request including a request remuneration offer from a requesting vehicle.
  5c) Granting or rejecting the received priority request.
  5d) Transmitting a priority request response to the requesting vehicle.
  5e) Modifying the host vehicle path to be less impeding to the requesting vehicle if the received priority request was granted.

Requesting priority from other vehicles may further include the following steps:
  4e) Generating a priority event record including an identity of the impeding vehicle.
  4f) Storing the priority event record.
  4g) Generating a remuneration record related to the priority event record. The remuneration record preferably includes a currency value of the host remuneration offer associated with the priority event record, an identity of the host vehicle as a debtor, and the identity of the impeding vehicle as a creditor.

Responding to other vehicles' priority requests may further include the following steps:
  5f) Generating a priority event record including an identity of the requesting vehicle.
  5g) Storing the priority event record.
  5h) Generating a remuneration record related to the priority event record. The remuneration record preferably includes a currency value of the request remuneration offer associated with the priority event record, an identity of the host vehicle as a creditor, and the identity of the requesting vehicle as a debtor.

The priority event record may include additional identifying information relating to the completion of the priority event, such as the time and date when the priority event occurred, and the location and the paths of the participating vehicles.

The remuneration record may be generated and settled in accordance with a cryptocurrency protocol or by using fiat money.

Granting or rejecting a received priority request may include presenting the priority request including the request remuneration offer through a user interface and receiving a user response to the priority request through the user interface.

Modifying the host vehicle path to be less impeding to the requesting vehicle may include presenting driving instructions to a driver of the host vehicle through a user interface. The driving instructions may include at least one of a change in speed, an absolute speed, a lane change, a heading change, and a turn maneuver. Alternatively, in automated vehicles traveling in a fully autonomous or semi-autonomous mode, modifying the host vehicle path to be less impeding to the requesting vehicle may include controlling a lateral and longitudinal motion of the host vehicle through a vehicle control interface. In particular, modifying the host vehicle path may include interfacing with an adaptive cruise control (ACC) and/or lane keeping assistance (LKA) system.

Requesting priority from other vehicles may further includes determining a desired host vehicle speed, determining a speed of the impeding vehicle, and determining the host remuneration as a function of the difference between the desired host vehicle speed and the speed of the impeding vehicle. Alternatively, requesting priority from other vehicles may further include determining an estimated time of arrival at a destination, determining an arrival time delay caused by the impeding vehicle, and determining the host remuneration as a function of the arrival time delay.

In some cases, a priority requesting vehicle may encounter two impeding vehicle, and only if both impeding vehicles agree to grant priority can the requesting vehicle achieve its goal. In such a case requesting priority from other vehicles may include identifying a second impeding vehicle which interferes with the host vehicle's path. A contingent host vehicle priority request including a contingent host remuneration offer may then be transmitted to the second impeding vehicle. The second impeding vehicle may respond with a second impeding vehicle response which grants or denies the contingent host vehicle priority request. The requesting vehicle may then transmit the host vehicle priority request including the host remuneration offer to the impeding vehicle only if the contingent host vehicle priority request was granted by the second impeding vehicle. In this scenario, the second impeding vehicle may be further away from the host vehicle than the impeding vehicle. One skilled in the art will recognize that the same concept applies when the requesting vehicle encounters three or more impeding vehicles, in which case the requesting vehicle may send contingent priority requests to two or more vehicles and obtain agreement from several impeding vehicles before initiating non-contingent priority requests.

A system for requesting and granting priority between a host vehicle and other vehicles includes vehicle sensors configured to detect objects and drivable surfaces in proximity of the host vehicle while the host vehicle is traveling along a host vehicle path. The system also includes a communication interface through which the host vehicle can communicate with other vehicles and with a central server. A memory is present and configured to store instructions. The system includes a processor, coupled to the memory, the communication interface, and the vehicle sensors. The processor executes instructions and performs operations to request priority from another vehicle. Those operations include:

1) Monitoring data from the vehicle sensors to detect an impeding vehicle which interferes with the host vehicle's path.
2) Identifying the impeding vehicle.
3) Transmitting a host vehicle priority request including a host remuneration offer through the communication interface to the impeding vehicle.
4) Receiving an impeding vehicle response which grants or denies the host vehicle priority request.

The processor also performs operations to grant priority to a requesting vehicle. Those operations include:

5) Monitoring data received from the vehicle sensors for possible changes to the host vehicle path.
6) Receiving a priority request including a request remuneration offer through the communication interface from the requesting vehicle.
7) Deciding whether to grant or reject the received priority request.
8) Transmitting a priority request response to the requesting vehicle.
9) Modifying the host vehicle path to be less impeding to the requesting vehicle if the received priority request was granted.

The processor may be configured to perform further operations when the impeding vehicle grants the priority request, including generating a priority event record including an identity of the impeding vehicle, storing the priority event record in the memory, and generating a remuneration record related to the priority event record. The remuneration record may include a currency value of the host remuneration offer associated with the priority event record, an identity of the host vehicle as a debtor, and the identity of the impeding vehicle as a creditor.

The processor may also be configured to perform further operations when granting priority to a requesting vehicle, including generating a priority event record including an identity of the requesting vehicle, storing the priority event record in the memory, and generating a remuneration record related to the priority event record. The remuneration record may include a currency value of the request remuneration offer associated with the priority event record, an identity of the host vehicle as a creditor, and the identity of the requesting vehicle as a debtor.

Within the system, the central server may comprise a database configured to store priority event records and remuneration records. The host vehicle may wirelessly communicate the priority event record and the remuneration record to the central server.

Within the system, the host vehicle may have a user interface device coupled to the processor. In that case, deciding whether to grant or reject the received priority request may include presenting the priority request including the request remuneration offer to a driver of the host vehicle and receiving input from the driver of the host vehicle.

Within the system, the host vehicle, through the communication interface, may receive status messages from other vehicles. These status messages may include an identity and a position of the other vehicles. In that case, identifying the impeding vehicle may include combining data received from other vehicles' status messages with data from the vehicle sensors.

The system may further include an ultrasound transmitter configured to periodically broadcast an ultrasonic beacon. The ultrasonic beacon may be modulated to include identity information and a timestamp. A first ultrasound receiver may be present and configured to received ultrasonic beacons. A second ultrasound receiver may be present and configured to received ultrasonic beacons, the second ultrasound receiver being spatially separated from the first ultrasound receiver. In this configuration, the processor, responsive to executing the instructions, is preferably configured to determine a first run-time of the ultrasonic beacon from a point of origin to the first ultrasound receiver and a second run-time of the ultrasonic beacon from the point or origin to the second ultrasound receiver. Based on these run times and the received time stamp, the processor may determine a position of the point of origin of the ultrasonic beacon.

In (semi) autonomous vehicles the system may include a vehicle control interface operatively connected to the processor and capable of controlling a lateral and longitudinal motion of the host vehicle. Modifying the host vehicle path may then be affected by the processor through the vehicle control interface.

The following detailed description of the invention is merely exemplary in nature and is not intended to limit the invention or the application and uses of the invention. Furthermore, there is no intention to be bound by any theory presented in the preceding background of the invention or the following detailed description of the invention.

DETAILED DESCRIPTION

One or more embodiments are now described with reference to the drawings. In the following description, for purposes of explanation, numerous details are set forth in order to provide a thorough understanding of the various embodiments. It is evident, however, that the various embodiments can be practiced without these.

Figure 1:
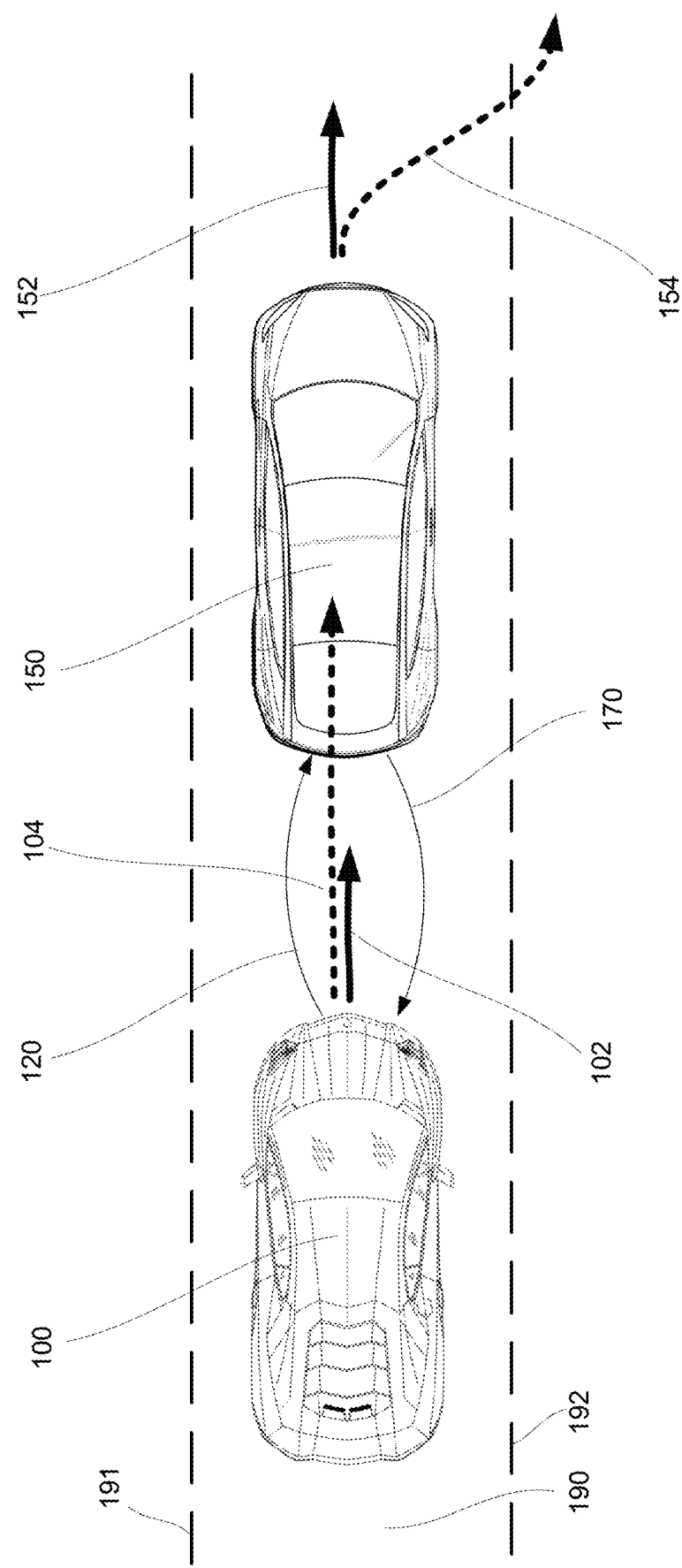
FIG. 1 is a diagram illustrating an example, non-limiting embodiment of two vehicles using a method for requesting and granting priority in accordance with various aspects described herein.

Referring now to FIG. 1, the interaction between two vehicles 100, 150 is schematically shown. In the illustrated scenario a leading vehicle 150 travels along a leading vehicle path 152. The trailing vehicle 100 travels along a trailing vehicle path 102. The path of a vehicle is understood to describe the time and position relationship of the vehicle. The path therefore includes direction (heading) and speed of a vehicle. The leading vehicle 150 and the trailing vehicle 100 are shown to travel in the same lane 190 which is demarked by left and right lane markings 191, 192.

Shown in broken line is a desired trailing vehicle path 104 of the trailing vehicle 100. The desired trailing vehicle path 104 has the same direction as the actual trailing vehicle path 102, but a higher speed. That is, the trailing vehicle 100 desires to drive faster than it presently does. The desired trailing vehicle path 104 intersects with the leading vehicle 150. The trailing vehicle thus cannot follow its desired path 104, and must travel at reduced speed to not collide with the leading vehicle 150. The leading vehicle 150 impedes the trailing vehicle's travel, forcing the trailing vehicle 100 to travel slower than it desires.

To remedy the undesirable situation of having to travel slower than desired, a priority request message 120 is sent from the trailing vehicle 100 to the leading vehicle 150. The priority request message 120 requests the leading vehicle 150 to change its path and give way to the trailing vehicle 100. The priority request message 120 may include an incentive, in particular a remuneration offer. The remuneration offer may describe a monetary value. The priority request message 120 presents an incentivized request, asking the leading vehicle to cooperate with the trailing vehicle 100 in allowing the trailing vehicle 100 to pass the leading vehicle 150.

Based on their role in the illustrated interaction, the leading vehicle 150 will be referred to as an impeding vehicle 150. From the perspective of the trailing vehicle 100 the leading vehicle 150 interferes with the trailing vehicle's desired path 104, thus impedes the trailing vehicle's travel. Based on its role, the trailing vehicle 100 will be referred to as the requesting vehicle 100. When describing aspects of an embodiment from the perspective of one vehicle, that vehicle will be referred to as the host vehicle.

The leading vehicle 150 can grant the trailing vehicle's priority request and alter its path 152 to an alternative path 154, thereby allowing the trailing vehicle 100 to accelerate and follow its desired path 104 while passing the leading vehicle. Alternatively, the leading vehicle 150 can deny the trailing vehicle's priority request and continue on its established path 152.

Figure 2:
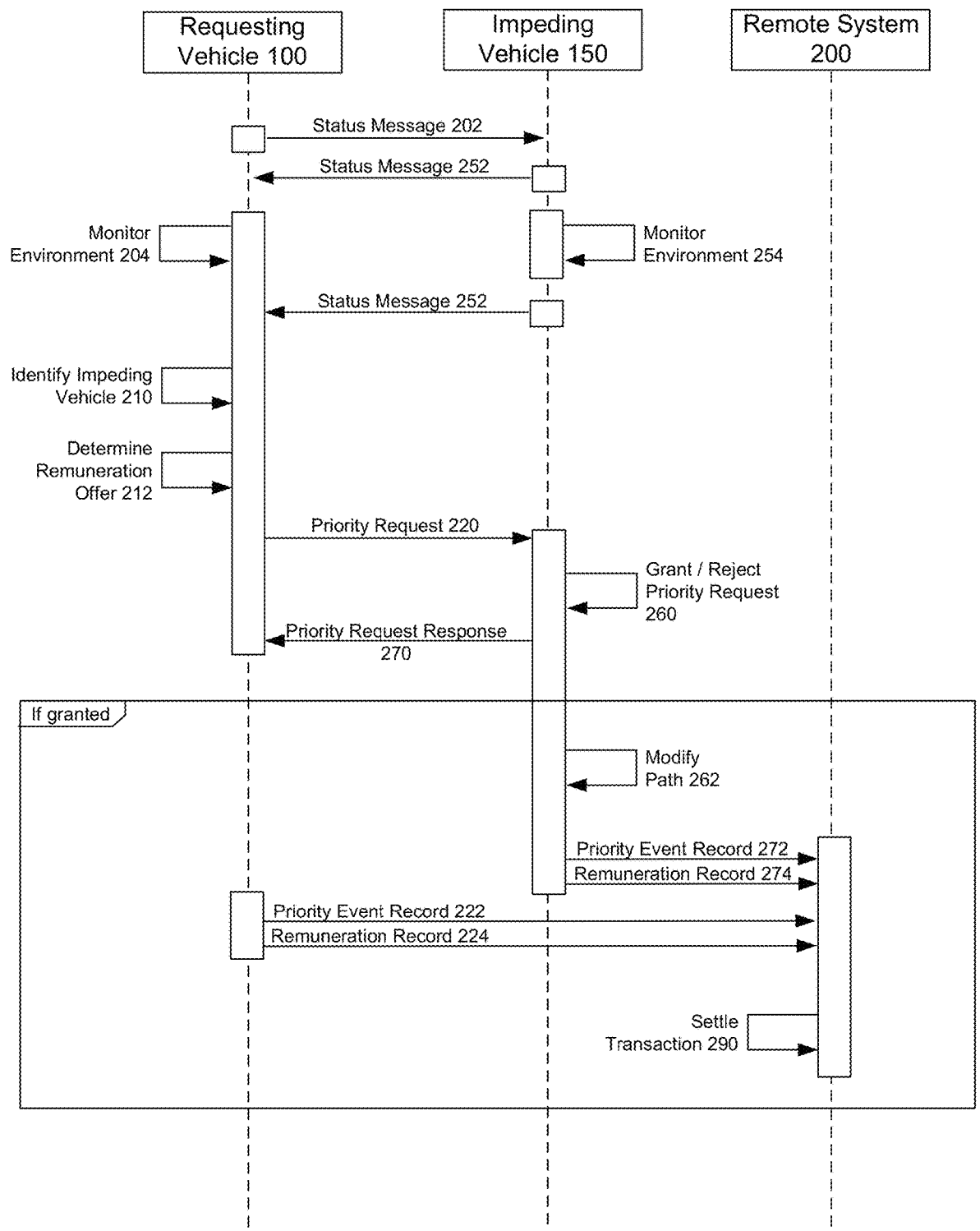
FIG. 2 is a sequence diagram illustrating an example, non-limiting embodiment of an interaction between a priority requesting vehicle and an impeding vehicle in accordance with various aspects described herein.

Referring now to FIG. 2, the interaction between a priority requesting vehicle 100 and an impeding vehicle 150 is shown in form of a sequence diagram. FIG. 2 illustrates steps included in a method for requesting and granting priority between a host vehicle and other vehicles. Based on its role, a host vehicle may be the requesting vehicle 100 or the impeding vehicle 150.

Both the requesting vehicle 100 and the impeding vehicle 150 periodically transmit status messages 202, 252. The status messages 202, 252 include at least position information and identifying information. The position information included in the status messages 202, 252 may be derived from a Global Navigation Satellite System (GNSS). The identifying information included in the status messages 202, 252 may be personally identifying, and may for example include elements of a license plate number, or may be anonymously identifying, such as a Bitcoin address.

The status messages 202, 252 are preferably broadcasted periodically, for example every 100 msec, and are not directed at any particular recipient but rather at all vehicles within proximity of the broadcasting vehicle. The status messages may be broadcasted according to the IEEE 802.11p and 1609 DSRC/WAVE standard and/or the SAE J2735 standard. The status message may include a SAE J2735 Basic Safety Message. The status messages may be used for additional purposes other than requesting priority from other vehicles, and may for example be used as part of an active safety system or cooperative vehicle feature such as platooning.

Both the requesting vehicle 100 and the impeding vehicle 150 monitor the environment around them as illustrated in environment monitoring sequence steps 204, 254. Monitoring the environment may include use of an object detection sensor, such as radar sensor, a lidar sensor, a camera sensor, or an ultrasonic sensor. Monitoring the environment 204, 254 may include free space detection, i.e. the detection of drivable surfaces. Monitoring the environment 204, 254 may include a coverage area of the vehicle sensors or be defined by a predetermined radius around the vehicle and/or distance in a particular direction from the vehicle.

While the priority requesting vehicle 100 travels along its path it may encounter the impeding vehicle 150. The priority requesting vehicle 100 may sense the presence of the impeding vehicle 150 in step 204 as part of monitoring its environment. The priority requesting vehicle 100 may combine data from its on-board vehicle sensors with data received from the impeding vehicle 150 through the impeding vehicle's status messages 252. In particular, the requesting vehicle 100 may determine its own position based on an on-board GNSS system. It may further detect a relative distance and velocity of the impeding vehicle 150 from the requesting vehicle 100 through one or more object detection sensors. The requesting vehicle may convert the relative position of the impeding vehicle 150 into an absolute geographic position and compare the so derived absolute geographic position of the impeding vehicle 150 with position information encoded within the status messages 252. In an identifying step 210 the requesting vehicle 100 may so identify the impeding vehicle. Identifying the impeding vehicle 150 allows the requesting vehicle 100 to address subsequent communication specifically to the impeding vehicle 150.

In a remuneration determination step 212 the requesting vehicle may determine a remuneration offer. The remuneration offer may include a reward to incentivize the impeding vehicle to accept the requesting vehicle's priority request. Alternatively, the remuneration offer may be an indication of societal value to the requesting vehicle 100 having priority over the impeding vehicle 150, and may e.g. include a number of passengers on board the requesting vehicle 100 or identify the requesting vehicle as an emergency vehicle. This allows e.g. forming virtual HOV lanes, in which vehicles with fewer passengers give priority to vehicle with more passengers and emergency vehicles.

In step 220 the requesting vehicle 100 transmits a priority request to the impeding vehicle 150. The priority request identifies the impeding vehicle by utilizing the results of the identification step 210. The impeding vehicle 150 receives the priority request and in step 260 decides to grant or reject the priority request. The outcome of the decision step 260 is transmitted in form of a priority request response in step 270 to the requesting vehicle 100.

If the priority request 220 is rejected, the method may come to an end. Alternatively, the requesting vehicle may revert back to the remuneration offer step 212 to determine its remuneration offer based on the knowledge that its previous offer was declined. In practice, steps 212, 220, 260, and 270 may be performed repetitively in form of a negotiation/bidding process to establish a remuneration offer that is acceptable to both the requesting vehicle and the impeding vehicle.

In various embodiments, creating a remuneration record 224, 274 may include factoring a "social share" into the remuneration record, wherein the "social share" is a configurable percentage of the total currency value of the remuneration record that is destined to be used for social/charity purposes. Similarly, a remuneration record 224, 274 may include an "operator share" reflecting a portion of the remuneration that is assigned to an operator of a remote system 200.

If the priority request is granted, the impeding vehicle 150 in step 262 modifies its path, based on data established by constantly monitoring the environment in step 254, to let the priority requesting vehicle 100 pass. Modifying its path 262 may include making changes to the impeding vehicle's speed and/or the impeding vehicle's heading. For example, the impeding vehicle 150 may alter its path by changing lanes on a multi-lane road, by pulling over, by waiting, or by creating a gap for the priority requesting vehicle.

At least one of or both the requesting vehicle 100 and the impeding vehicle 150 may create a record of the granted priority request and the subsequent priority event. The priority event here refers to the impeding vehicle having modified its path and allowed the requesting vehicle to accelerate and/or to pass, thereby allowing the requesting vehicle to reach its destination sooner than had the priority event not taken place. A priority event is thus the successful conclusion and execution of a priority request. The requesting vehicle 100 and the impeding vehicle 150 may both transmit their respective priority event records 222, 272 and associated remuneration records 224, 274 to a remote system 200. The remote system 200 may settle the exchange of value as indicated by the remuneration records 224, 274 between the requesting vehicle, which is a debtor of the transaction, and the impeding vehicle, which is a creditor of the transaction, as illustrated in step 290.

Determining a remuneration offer in step 212 and evaluating the sufficiency of the remuneration offer in step 260 may be based on various rules that help determine a value of a priority event as will be explained in more detail with respect to FIG. 4a-d. Generally, the value of a priority event may be set at a fixed price, or may be determined in response to one or more input parameters. Suitable input parameters to determine the value of a priority event are the anticipated delay caused by the impeding vehicle (which is also the expected reduction in travel time by executing the priority event), a difference in vehicle speed relative to a desired vehicle speed caused by the impeding vehicle, an estimated arrival time, and a time that has expired since travel has been impeded by the impeding vehicle.

In various embodiments, generating and settling remuneration records in steps 224, 274 and 290 may be performed in accordance with a cryptocurrency protocol. In various embodiments, remuneration records in steps 224, 274 and 290 may be performed using fiat money.

Modifying the vehicle path in process step 262 may include accessing vehicle functions required to facilitate a priority event, e.g. speed/acceleration, steering, braking, indication of change of direction, etc. via a vehicle control interface. Alternatively, modifying the vehicle path may include communicating, through a user interface, either visually, audibly or audio-visually information required to facilitate the priority event to the driver of the impeding vehicle. The information communicated to the driver may include the fact of having granted priority to another vehicle and may further include proposed driving instructions such as recommended changes to speed and direction.

Modifying the vehicle path in process step 262 may include pulling-over or slowing down to create a gap if the impeding vehicle is traveling on a single-lane road. Modifying the vehicle path in process step 262 may include performing a lane change into a slower lane to clear the lane for the requesting vehicle if the impeding vehicle is traveling on a multi-lane road. Modifying the vehicle path in process step 262 may also include not performing a lane change into a faster lane and reserving the faster lane for the approaching requesting vehicle if the impeding vehicle is traveling on a multi-lane road. That is, the requesting vehicle may reward a potentially impeding vehicle for not blocking the requesting vehicle's path. The term "impeding vehicle" thus not only includes vehicles presently interfering with the requesting vehicle but includes also vehicles that may cause a future interference with the requesting vehicle.

In various embodiments, a priority event may take place when in a single-lane setup the granting vehicle(s) (e.g. a group of platooning vehicles) and the requesting vehicle use the same lane and the granting vehicle(s) facilitate priority by speeding up, slowing down or freeing up the lane sufficiently to allow for the requesting vehicle to pass.

In various embodiments, a priority event may take place when a priority granting vehicle surrenders its right of way to a requesting vehicle, for example at an intersection.

For purposes of simplicity of explanation, the respective processes are shown and described as a series of sequence steps in FIG. 2. It is to be understood and appreciated that the claimed subject matter is not limited by the order of the steps, as some steps may occur in different orders and/or concurrently with other steps from what is depicted and described herein. Moreover, not all illustrated steps may be required to implement the methods described herein.

Figure 3:
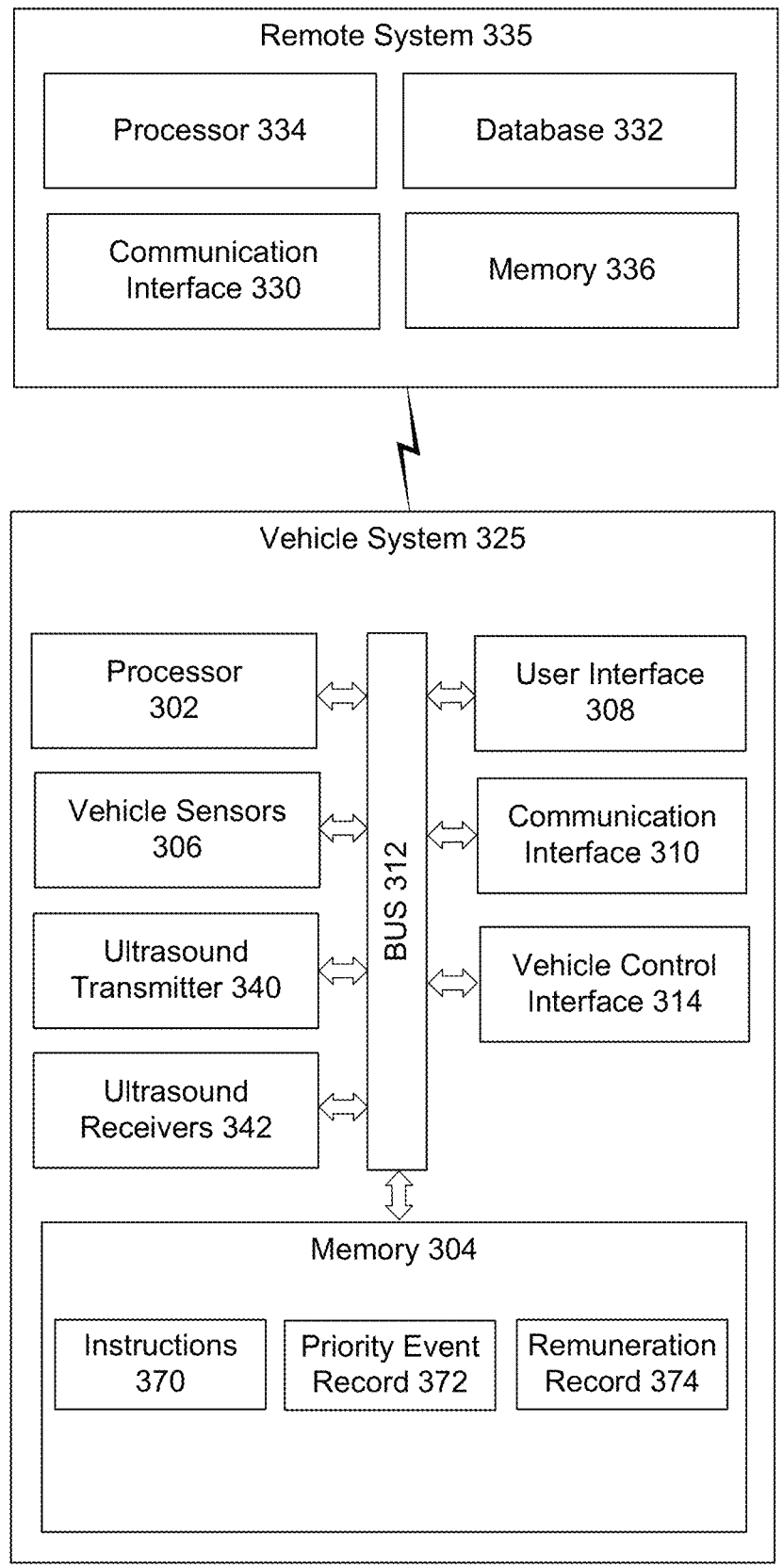
FIG. 3 is a block diagram illustrating an example, non-limiting embodiment of a vehicle system and a remote system in accordance with various aspects described herein.

Turning now to FIG. 3, a block diagram is shown illustrating an example, non-limiting embodiment of a vehicle system in accordance with various aspects described herein.

In particular, a vehicle system 325 is shown for use in conjunction with a host vehicle, such as the requesting vehicle 100 or the impeding vehicle 150 shown in FIG. 1 and FIG. 2. The requesting vehicle 100 and the impeding vehicle 150 may be a connected car, a delivery vehicle, fleet vehicle, service vehicle, freight transportation vehicle or other vehicle.

In particular, the vehicle system 325 includes a processor 302, memory 304, and a communication interface 310 for providing wireless access. Wireless access may include communication with a remote server provided via a communications network, for example a cellular telephone network. Wireless access may also include ad-hoc wireless communication with other vehicles through, for example, dedicated short range communication (DSRC). In particular, the communication interface can include a wireless transceiver that operates via 3G, 4G, 5G or higher cellular communications, an 802.11 standard such as 802.11n, 802.11ac, 802.11p or other wireless local area network protocol, a Bluetooth, ZigBee or other personal area network communications access terminal.

The processor 302 may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The memory 304 can be a single memory device, a plurality of memory devices, and/or embedded circuitry of the processor 302. Such a memory device may be a read-only memory, random access memory, volatile memory, non-volatile memory, static memory, dynamic memory, flash memory, cache memory, and/or any device that stores digital information. Note that if the processor 302 includes more than one processing device, the processing devices may be centrally located (e.g., directly coupled together via a wired and/or wireless bus structure) or may be located in a distributed form (e.g., cloud computing via indirect coupling via a local area network and/or a wide area network). Further note that if the processor 302 implements one or more of its functions via a state machine, analog circuitry, digital circuitry, and/or logic circuitry, the memory 304 storing the corresponding operational instructions may be embedded within, or external to, the circuitry comprising the state machine, analog circuitry, digital circuitry, and/or logic circuitry. Still further note that, the memory 304 may store, and the processor 302 may execute, hard coded and/or operational instructions corresponding to at least some of the steps and/or functions described herein. The memory 304 can be included in an article of manufacture. While a particular bus architecture is shown that includes a single bus 312, other architectures that include multiple buses and/or direct connectivity between one or more elements can likewise be employed. Further, the vehicle system 325 can include additional elements that are not expressly shown. In addition, while shown as a single homogeneous system of components, these components may be embedded in the vehicle at the time of sale, included in an aftermarket device that is installed in the vehicle, included in a user device that can be transported by the vehicle or any combination thereof.

The vehicle system 325 can include vehicle sensors 306 such as a global navigation satellite system (GNSS) receiver, one or more accelerometers, a vehicle lidar system, an RF based location system and/or one or more other sensors that can generate the geographical position and/or orientation of the vehicle. The vehicle system 325 further can include vehicle sensors 306 such as vehicle speed sensors, a video camera, a vehicle radar system, an ultrasonic ranging system and/or one or more other sensors that can detect information about the position, speed, direction and indicated and/or potential changes to position, speed and direction of the host vehicle and/or other vehicles within a certain radius and/or distance in a particular direction. The vehicle sensors 306 can include one or more camera sensors coupled to a computer vision system to detect lane markings, road signs, license plates, and drivable surfaces (free space). The vehicle sensors may include sensors to predict future actions of other vehicles, e.g. by recognizing brake lights, blinker lights, and so forth. The vehicle sensors 306 may further include a navigation system and map data of the environment. The use of map data in combination with a GNSS allows the vehicle system 325 to sense information about its environment that is beyond the range of on-board sensors which may be limited to a line of sight.

The vehicle system 325 may include an ultrasound transmitter 340 which is configured to periodically broadcast an ultrasonic beacon. The ultrasonic beacon may be modulated to include identity information and a timestamp. The vehicle system 325 may also include ultrasound receivers 342, including at least a first ultrasound receiver and a second ultrasound receiver which are configured to receive ultrasonic beacons emitted by other vehicles. The second ultrasound receiver is spatially separated from the first ultrasound receiver on the host vehicle. The processor 302 may be configured to determine a first run-time of an ultrasonic beacon from a point of origin to the first ultrasound receiver, a second run-time of the ultrasonic beacon from the point of origin to the second ultrasound receiver, and a position of the point of origin of the ultrasonic beacon. Instead of or in addition to using ultrasound the beacon may be broadcasted as a radio wave or in the invisible light spectrum.

In various embodiments, the processor 302 is used to continuously monitor data received from the vehicle sensors for the presence of an impeding vehicle within the host vehicle's path or possibly interfering with the host vehicle's path. The processor 302 is further used to identify the impeding vehicle, i.e. to associate an identifier with the impeding vehicle. The identifier may e.g. be a license plate number recognized by a computer vision system or source information encoded within a beacon message or received through car-to-car/vehicle-to-vehicle communication using the communication interface 310.

Analysis of the data received from the vehicle sensors is performed in accordance with rules stored in memory 304. The rules serve to recognize impeding vehicles by their interference with the host vehicle's path. The interference may in particular be the host vehicle having to travel slower than desired, and therefore reaching its destination later than desired. When an impeding vehicle is discovered, a negotiation for remuneration can take place automatically between the vehicle system 325 of the requesting (impeded) vehicle and the impeding vehicle. Manifestation of a potential priority event can occur in various situations, for example on routes with single lanes for one direction, multiple lanes for one direction, at crossings, at intersections, or combinations thereof or any other setup.

In various embodiments, when an impeding vehicle is detected and the remuneration between the requesting vehicle and the impeding vehicle is successfully negotiated the impeding vehicle will modify its path by taking a yielding action and the requesting vehicle may take a passing action. In the impeding vehicle, a user interface device 308 may be used to instruct a human driver as to what action to take. Alternatively, in an automated vehicle operating in a (semi) autonomous mode the processor 302 may influence a longitudinal lateral motion of the vehicle directly through a vehicle control interface 314. That is, the user interface device 308 and/or the vehicle control interface 314 will be used to either inform the driver about the actions required or to control the vehicle directly. In particular, informing the driver about which action to take can be in form of audio, video, or audio-visual communication. The user interface device 308 may thus be, for example, a speaker, a display screen, a head-up display or any similar device. The user interface device 308 may also receive input from the human driver. For example, the user interface device 308 may include keys or buttons, a touch-screen, a speech recognition system, or a gesture recognition system.

Controlling the vehicle directly can take the form of transferring commands to a control unit capable of autonomously driving the vehicle through the vehicle control interface 314. In another example, a mix of actions required from the driver and direct control of the vehicle is possible, e.g. in the presence of assisted driving capabilities. In yet another example required actions might also be communicated to other vehicle systems with the same or similar function which are capable of communicating and exchanging services and information, involved in the potential priority event for example via car-to-car/vehicle-to-vehicle communication facilitated by communication interface 310.

In various embodiments, the processor 302 may execute instructions 370 stored in the memory 304 to detect a successful completion of a priority event, for example by recognizing a successful execution of actions required to facilitate the previously requested priority. In that case, a respective priority event record 372 is created and stored locally in the memory 304 and/or communicated via communication interfaces 310 and 330 to a remote system 335. The priority event record 372 may be stored remotely in a database 332. Such priority event records can include a date, time and/or place of the event, the related remuneration and/or the distribution thereof, identification of the vehicles, drivers and/or users involved and/or vehicle specific data such as speed, direction, orientation, time spent in a particular lane and/or relative and/or absolute position.

In various embodiments, the processor 302, upon creation and storage of a priority event record 372, generates a remuneration record 374 that is unique to the priority event record 372 and that includes a monetary or pseudo-monetary value. For example, the remuneration record 374 can contain a currency value corresponding to fiat money such as US Dollar, Euro or any other currency. In other examples, the remuneration record 374 can contain a currency value corresponding to a digital currency such as Beenz, e-gold, Rand, Ven, Utoken or other non-crypto currency. In yet other examples, the remuneration record 374 can contain a currency value generated in accordance with a cryptocurrency protocol, such as an Auroracoin, Bitcoin, BlackCoin, Dash, Dogecoin, DigitalNote, Ethercoin, Litecoin, Mastercoin, Mazacoin, Monero, Namecoin, Nxt, Peercoin, Primecoin, Ripple, or other cryptocurrency. In either case, the remuneration record indicates a currency value that is associated with the priority event. In all examples, the remuneration record can include a configurable share to be attributed to one or more charitable organizations (social share).

In various embodiments, the remuneration record 374 can be stored locally in the memory 304 and/or be communicated via communication interfaces 310 and 330 and stored in a database 332 of the remote system 335. In particular, the remuneration record 374 can be encrypted to prevent unauthorized use or duplication and to protect the integrity of the monetary value that the digital record represents. The remuneration record 374 can then be settled once and only once. Measures might be taken to ensure that any particular remuneration record is only settled once, for example by updating the remuneration record's status after settlement and/or storing with it details of the settlement transaction.

In various modes of operation, the vehicle system 325 communicates the remuneration record 374 for settlement between the parties involved. For example, the vehicle system 325 of the host vehicle can, via communication interface 310, directly communicate the remuneration record 374 to a vehicle system 325 of another vehicle with the same or similar function. In another example, the vehicle system 325 can communicate the remuneration record via the communication interface 310 directly to a mobile phone, a mobile wallet or "app", a payment card or any such device.

In yet another example, the remuneration record 374 may be a digital currency record and is communicated via the communication interface 310 and a network to a server that holds an account associated with the user of the host vehicle. In particular, the remuneration record may be settled by debiting/crediting an account of the user, such as a bank account, credit card account, or other payment of service account of the users that hold a monetary value.

In various embodiments, in case of creation of a priority event record 372 and related remuneration record 374, information about the priority event and the currency value of the related remuneration record is communicated to the driver in real-time via a user interface device 308. Informing the driver can take the form of audio, video, or audio-visual communication transferred, for example, via a speaker, screen, head-up display or any such device. The information presented can next to the currency value itself and the information whether it is payable or receivable for example include a time of the event, the other party or parties involved, and/or any travel time saved/extra travel time accepted as a result of the event.

In various embodiments, a remote system 335 includes a database 332, a memory 336, configured to store instructions and a processor 334. Responsive to executing the instructions, the remote processor 334 may calculate pairs of expected changes in travel time and the respective expected accumulated remuneration. Such calculation can for example be based on stored information from database 332 and/or current information, e.g. traffic density, weather, prices paid for previous priority events, etc. In one example, the calculations can be requested by the user via the vehicle system 325 using the communication interface 310 before or during traveling on a certain route. A vehicle system 325 can use the user interface device 308 to present the user with one or more combinations of expected time of arrival and the anticipated priority event related costs and/or income. In another example, the user can enter a target time for arriving at a destination and the vehicle system 325 can present information as to whether the desired arrival time can be achieved and estimate an anticipated number of encounters with impeding vehicles and the anticipated cost of priority events that may need to be executed to meet the desired arrival time.

Likewise, a user may be able to specify the latest acceptable time to arrive at a certain destination and the vehicle system 325 can present information about the actual expected time of arrival and the expected income stemming from granting priority to other vehicles along the way. In yet another example, the vehicle system 325 may suggest changes to the planned route to minimize priority event related costs or maximize priority event related income while at the same time maintaining the earliest possible arrival time. In yet another example, the vehicle system 325 may suggest changes to the planned route along with one or more combinations of expected time of arrival and the corresponding priority event related costs/income.

In various embodiments, the processor 302 in the vehicle system 325 is used to determine a remuneration offer to be communicated to an impeding vehicle. The determination can but does not have to include communication via the communication interface 310 to other vehicle systems 325 or to other vehicle systems with the same or similar function. If other vehicle systems are involved, the process of finding a price to offer as part of a priority request can involve a process of negotiation and/or bidding. Furthermore, establishing the amount and/or distribution of the remuneration offer for priority may be accomplished in various ways and combinations thereof. In one example, the currency value of the remuneration offer may be a fixed price per priority event. In another example, the currency value of the remuneration offer may be calculated depending on an anticipated travel time delay caused by the impeding vehicle. Worded differently, the remuneration offer may consider the travel time saved if the priority request was granted. The remuneration offer may also consider an estimated inconvenience caused to the impeding vehicle by accepting the priority request. In yet another example, the calculation of the currency value of the remuneration offer may depend on required changes of speed by either of the vehicles involved. In yet another example, calculation of the currency value of the remuneration offer may depend on the time the requesting and/or impeding vehicle have spent in a certain lane before requesting/granting priority.

Figure 4A:
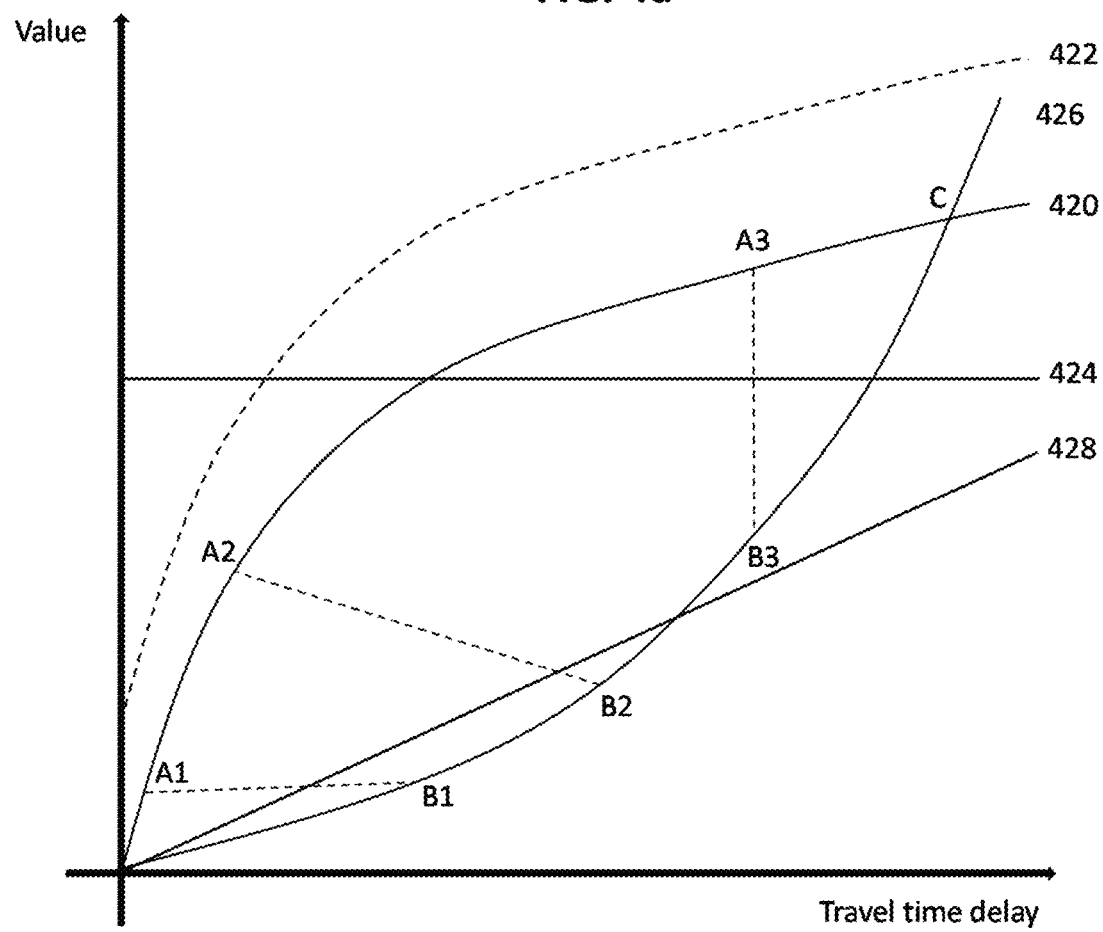
FIG. 4a, FIG. 4b, FIG. 4c, and FIG. 4d are graphical diagrams illustrating example, non-limiting embodiments of functions for determining a monetary value in accordance with various aspects described herein.

Turning now to FIG. 4a, a graphical diagram is shown illustrating example, non-limiting embodiments of functions for determining a currency value of a priority event in accordance with various aspects described herein. In particular, the graphical diagram of FIG. 4a shows different functions that can be used to establish a value (y-axis) of remuneration for a priority request as a function of the estimated travel time delay (x-axis) caused by an impeding vehicle. The graphical diagram of FIG. 4b shows different functions that can be used to establish a value (y-axis) of remuneration for a priority request as a function of the difference between a desired travel speed and a reduced travel speed caused by an impeding vehicle.

As described before, a vehicle system 325 can be used to determine a remuneration offer made to an impeding vehicle when requesting priority from the impeding vehicle. To determine the currency value for a remuneration offer one or a combination of several concepts might be used. The type of function used or its exact shape might vary between vehicle systems, vehicles, users of vehicle systems, or other variables such as time of the day, traffic density, weather conditions, geographical position of the vehicle, or the like. Changes of/to the concept or function applied to determine the currency value for a remuneration offer that is part of a priority request may generally be communicated to a vehicle system via the communication interface 310 but may also be set by the vehicle system's user or may be the result of a set of rules configured in memory 304.

Different vehicle systems 325 may be configured to use different concepts and/or functions to determine a currency value for a priority request. In case of a difference between a remuneration offer by the priority requesting vehicle and the expected remuneration by the priority granting vehicle an agreement may be reached through a process of automatic or manual negotiation or bidding, an explicit decision by the vehicle system user, or any other automatic or manual approach.

Figure 4B:
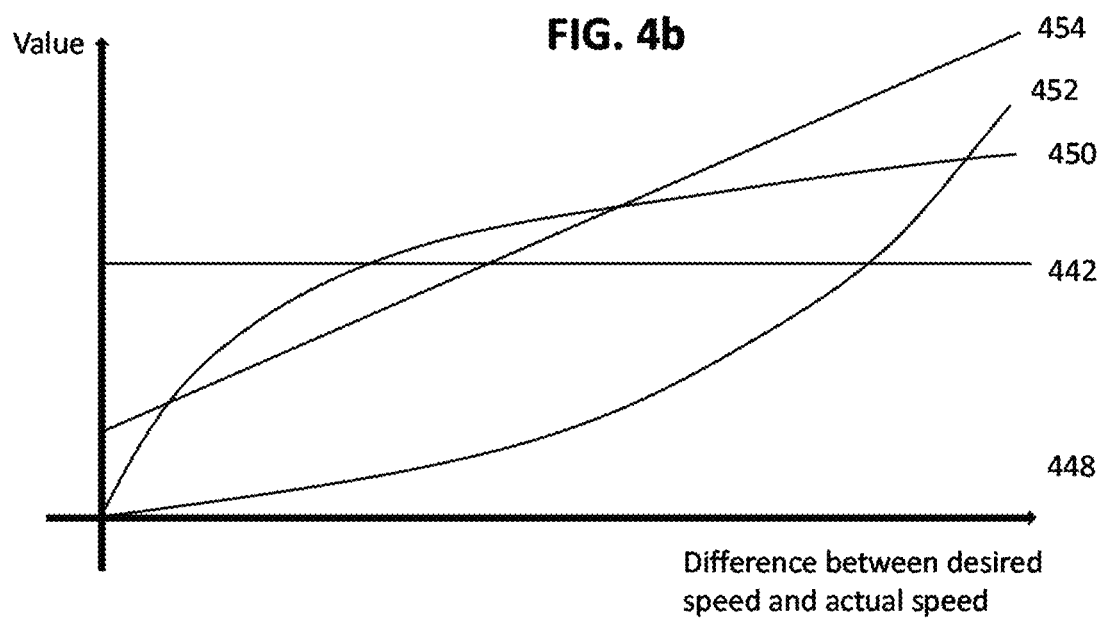

One example of determining the remuneration offer of a priority request is the use of a fixed price per priority event as indicated by line 424 in FIG. 4a and line 442 in FIG. 4b. The fixed price itself would be applied to each priority event for as long as it is applicable but might in itself be subject to change as described above by for example manual interference of the user, application of rules in the configuration, information received via the communications interface 310 and/or variables such as time of the day, traffic density, weather conditions, geographical position of the vehicle or the like.

Another example of determining the remuneration offer of a priority request is the calculation of a currency value as a function of the anticipated travel time delay inflicted onto the requesting vehicle by the impeding vehicle. Similarly, an impeding vehicle may evaluate the sufficiency of a remuneration offer in deciding to grant or deny a priority request by estimating an anticipated increase in travel time by accepting a priority request. The requesting vehicle and the impeding vehicle may each determine the value of a priority request by considering the effect of a granted priority request on their own travel time, the effect on the other party's travel time, and/or a ratio of both.

In some cases, an impeded vehicle may request priority from two or more impeding vehicles. In such cases, the requesting vehicle may transmit conditional priority requests to establish that all impeding vehicles will accept its priority requests. In case of more than one granting vehicle determining sufficiency of a remuneration offer may consider an average, a weighted average, or any other mean of arriving at a representative value for the extra travel time accepted. In yet another example, the currency value of the remuneration may depend on the time the requesting vehicle and/or the impeding vehicle(s) have spent in a particular lane before the potential priority event was detected and/or the actual priority event took place.

Lines 420, 422, 424, 426, and 428 shown in FIG. 4a illustrate potential functions associating a currency value for a priority event with a travel time delay inflicted onto the priority requesting vehicle by the impeding vehicle. As shown, the function of value over time delay can take different shapes and is not limited to the examples presented here.

Line 420 illustrates an example function of associating a currency value for a priority event with an anticipated travel time delay. The line 420 establishes the value a requesting vehicle's vehicle system 325 or its user might attach to the travel time saved by a particular priority event. As shown, the longer the anticipated travel time delay caused by the impeding vehicle, the higher the value of a priority event. The estimated travel time delay caused by the impeding vehicle, which is equivalent to an estimated travel time savings by successfully executing a priority event, is positively correlated with the value of the priority event, but has a diminishing incremental value. Line 422 illustrates the same characteristics as line 420 but associates a generally higher value with the same potential time savings.

Line 424 shows a constant value per priority event, i.e. the value of a priority event and thus the remuneration offered to an impeding vehicle is independent of an estimated travel time delay.

Line 426 illustrates an example in which the currency value of a priority event increases exponentially with the potential time savings by executing the event. Line 428 illustrates an example in which the currency value of a priority event increases linear with the potential time savings by executing the event. The slope of line 428 may be increased or decreased to represent different monetary values per unit of travel time saved.

The characteristic lines 420, 422, 424, 426, and 428 may be used to both represent a value to a requesting vehicle to establish a remuneration offer and to establish a value for an impeding vehicle to determine whether or not a remuneration offer is sufficient. In that case, the travel time delay represents an estimated increase in travel time for the impeding vehicle which may have to slow down or pull over to let the requesting vehicle pass in case the priority request is granted, thereby increasing the impeding vehicle's travel time.

In an example where line 420 represents the value attributed to executing a priority event as a function of the travel time saved by a requesting vehicle and line 426 represents the value attributed to a priority event as a function of the additional travel time accepted by one or more granting vehicles, a particular priority event might for example represent an estimated saved travel time of the requesting vehicle as indicated by points A1, A2 or A3 and a corresponding value attributed to the additional travel time accepted by one or more granting vehicles as indicated by points B1, B2 or B3. Noteworthy is point C where both the value attributed to the priority event as well as the travel time saved by a requesting vehicle and the extra travel time accepted by one or more granting vehicles are identical. However, though possibly identical, the amount of travel time saved by a requesting vehicle and the additional travel time accepted by one or more granting vehicles will probably be different per priority event. Hence, also the values attributed to priority event for the amount of travel time saved by a requesting vehicle and the additional travel time accepted by one or more granting vehicles are likely to be different. In that case, to arrive at a value for the priority event the aforementioned process of automatic or manual negotiation or bidding, an explicit decision by the vehicle system user or any other automatic or manual approach might be employed.

Referring now to FIG. 4b, another example of a concept for determining a value for the remuneration of a priority event is based on a comparison of a desired speed with the reduced speed caused by an impeding vehicle. Generally, the speed comparison can also be used by the impeding vehicle(s) to calculate the sufficiency of a remuneration offer, e.g. when the alternative path which would be executed by the impeding vehicle causes the impeding vehicle to reduce its speed.

Line 442 reflects a constant value per priority event, irrespective of the change of the requesting vehicle's speed associated with the event. For example, a requesting vehicle may be willing to offer a fixed remuneration of e.g. $1 to pass an impeding vehicle.

Line 454 shows an increasing value of a priority event with increasing difference between the desired speed and the actual speed. A requesting vehicle wishing to travel 55 mph may, for example, be willing to offer $2 for a farm tractor traveling 20 mph to pull over and let the requesting vehicle pass, but only $1 for a car traveling 45 mph to pull over and let the requesting vehicle pass.

Line 450 reflects a logarithmic growth associating the value of a priority event with the expected increase of the requesting vehicle's speed due to the priority event. A requesting vehicle may e.g. be willing to pay $5 to increase its speed by 5 km/h, but only $8 to increase its speed by 10 km/h. Line 450 thus indicates a diminishing return of driving faster.

Line 452 reflects an exponential growth associating the value of a priority event with the expected increase of the requesting vehicle's speed due to the priority event. A requesting vehicle may e.g. be willing to pay only $5 to increase its speed by 5 km/h, but $12 to increase its speed by 10 km/h. Line 450 thus indicates an increasing return of driving faster.

Figure 4C:
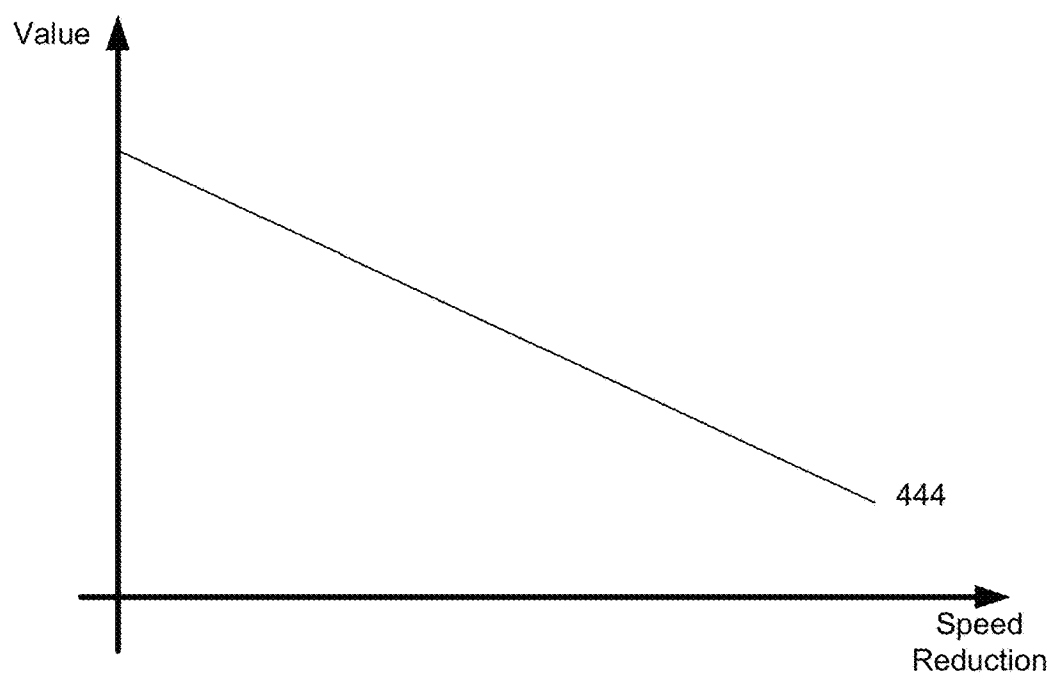

FIG. 4c illustrates a method to establish the value of a priority event before the impeding vehicle has caused impediment to the requesting vehicle. This method may e.g. be used when the requesting vehicle is approaching the impeding vehicle. The requesting vehicle, through its vehicle sensors, has information about its own speed and the impeding vehicle's speed. It can so calculate a necessary speed reduction after having caught up with the impeding vehicle, which is shown on the x-axis of FIG. 4c and equivalent to the relative velocity between the requesting vehicle and the impeding vehicle. As shown, the value of the priority event is highest if the requesting vehicle does not have to reduce its speed if the impeding vehicle grants priority. If the requesting vehicle has to reduce its speed even in case of a successful priority event taking place the value of the priority event diminishes.

Figure 4D:
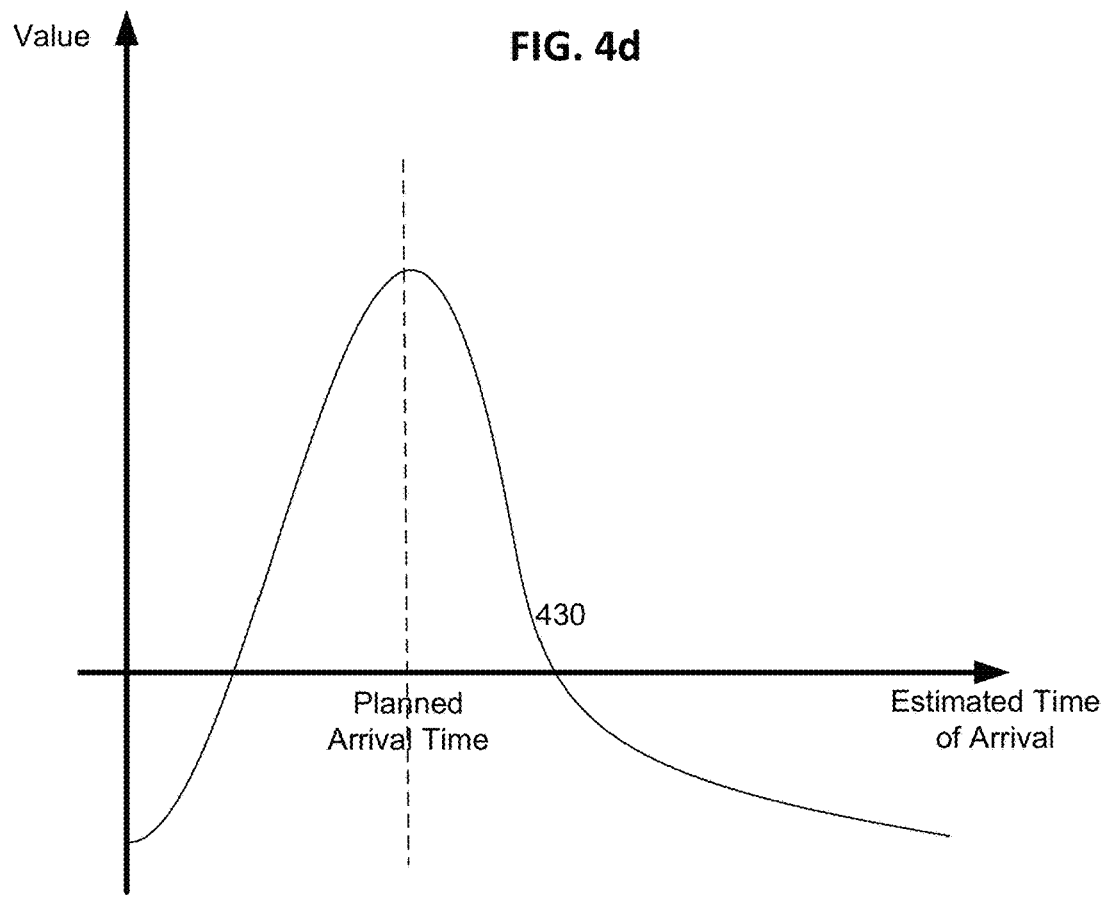

FIG. 4d illustrates yet another method of establishing the value of a priority event. Here, the host vehicle system constantly calculates an estimated time of arrival (ETA) at a destination. The value associated with the expected arrival time after successful execution of a priority event as indicated by line 430 has a maximum when the estimated arrival time matches a planned arrival time, which the user of a vehicle may have previously entered into the vehicle system. Arriving earlier than planned (values with ETA being less than the planned arrival time) or arriving later than planned (values with ETA being greater than the planned arrival time) offers limited value. As illustrated in FIG. 4c, the value to arrive on time (at the planned arrival time) is positive, indicating that the host vehicle may act as a requesting vehicle and is willing to offer incentives to impeding vehicles to arrive on time. Being too early or too late is shown as having a negative value. In these cases, the host vehicle is willing to accept priority requests from other vehicles, if the offered remuneration is greater than the value indicated.

Turning now to FIG. 5a-5d, example, non-limiting embodiments of use of a vehicle system in accordance with various aspects described herein are illustrated. Each Figure shows a traffic situation including a priority requesting vehicle RV and one or more priority granting vehicles GV before and after a priority event has taken place.

Figure 5A:
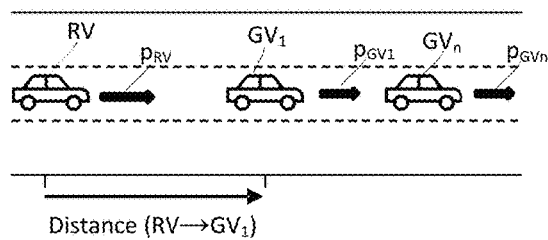
FIG. 5a, FIG. 5b, FIG. 5c, and FIG. 5d are graphical diagrams illustrating example, non-limiting embodiments of use of a method and vehicle system in accordance with various aspects described herein.
Figure 5A:
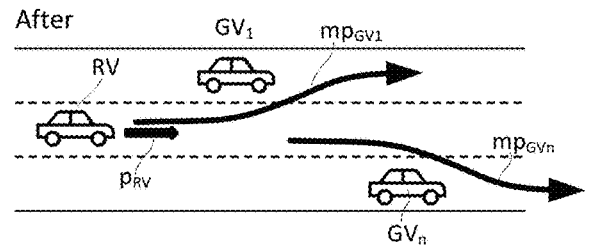

FIG. 5a shows a priority event taking place in a multi-lane environment. The granting vehicle(s) are positioned in front of the requesting vehicle on the same lane (which can be any lane except for the right lane) and the granting vehicle(s) grant priority to the requesting vehicle by leaving the lane.

In the "before" depiction the priority requesting vehicle RV is shown approaching a granting vehicle $GV_1$ and potential additional granting vehicle(s) $GV_n$ from behind in the same lane on a road with multiple lanes for one direction. The requesting vehicle RV is following a path $p_{RV}$ which interferes with the paths $p_{GV_1}$, $p_{GV_n}$ of the granting vehicles. In this situation, a potential priority event is identified by vehicle system in either the receiving and/or the granting vehicle(s). Vehicle sensors and/or vehicle-to-vehicle communication is used to detect and identify the vehicles involved, their absolute and/or relative position, and their speed and/or distance. The vehicle system may e.g. detect the distance RV→$GV_1$ between the requesting vehicle RV and the first granting vehicle $GV_1$. The distance RV→$GV_1$ as shown is decreasing, that is the requesting vehicle RV is traveling faster than the first granting vehicle $GV_1$. The requesting vehicle in this situation decides to transmit a priority request to the granting vehicles $GV_1$, $GV_n$.

The "after" depiction shows the result after the requesting vehicle RV has been granted priority by the granting vehicles $GV_1$, $GV_n$. Here, the granting vehicles modify their paths by leaving the requesting vehicle's lane. The first granting vehicle $GV_1$ has modified its path $p_{GV1}$ to a modified path $mp_{GV1}$, departing the center lane to the left. The other granting vehicle $GV_n$ has modified its path $p_{GVn}$ to a modified path $mp_{GVn}$, departing the center lane to the right. The priority requesting vehicle can continue its travel in the center lane without having to alter its path $p_{RV}$.

Figure 5B:
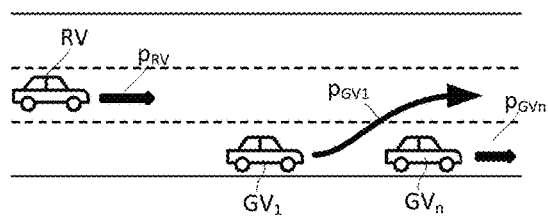
Figure 5B:
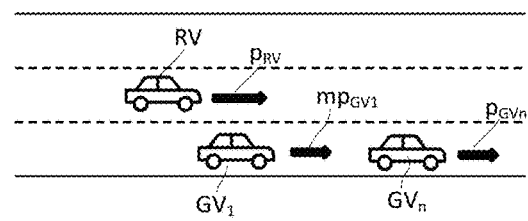

FIG. 5b shows an alternative scenario taking place on a multi-lane road. Here, the granting vehicle $GV_1$ grants priority to the requesting vehicle RV by not changing into the lane in front of the approaching requesting vehicle RV and thus not blocking the requesting vehicle RV.

In the "before" depiction of FIG. 5b the requesting vehicle RV is shown as approaching the granting vehicle $GV_1$. The granting vehicle is about to pull into the center lane to pass another vehicle $GV_n$. The path of the granting vehicle $GV_1$ interferes with the path of the requesting vehicle RV. In this situation, the requesting vehicle RV may utilize on-board sensors such as a camera to detect a blinker signal of the granting vehicle $GV_1$ to anticipate its plan to pull into the center lane. Alternatively, the path of the granting vehicle $GV_1$ may be wirelessly broadcasted by the granting vehicle $GV_1$. The requesting vehicle RV issues a priority request.

The "after" depiction of FIG. 5b shows the granting vehicle $GV_1$ having modified its path to not change lanes and instead continue to follow another vehicle $GV_n$ in the right lane. The modified path of the granting vehicle is marked as $mp_{GV1}$.

Figure 5C:
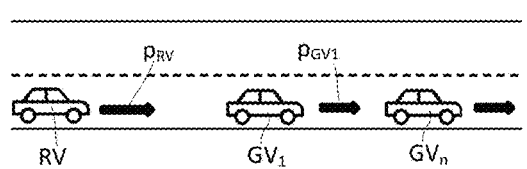
Figure 5C:
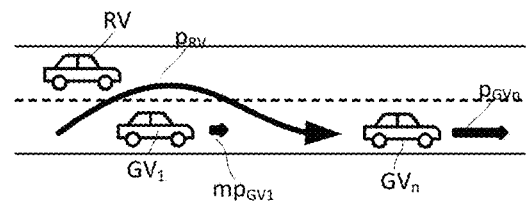

FIG. 5c illustrates a priority event taking place in a single-lane setup where the granting vehicle(s) (e.g. a group of platooning vehicles) and the requesting vehicle use the same lane and the granting vehicle(s) facilitate priority by speeding up, slowing down or freeing up the lane sufficiently to allow for the requesting vehicle to pass.

In the "before" depiction of FIG. 5c the requesting vehicle RV is shown as approaching the granting vehicle $GV_1$. The granting vehicle $GV_1$ is following another vehicle $GV_n$ in the same lane on a road with a single lane for the direction the vehicles are travelling in. The requesting vehicle RV desires to drive faster than the granting vehicle $GV_1$. and requests priority from the granting vehicle $GV_1$.

The "after" depiction of FIG. 5c shows the result of the priority request having been granted: The granting vehicle $GV_1$ has modified its path $p_{GV1}$ to a modified path $mp_{GV1}$. More specifically, the granting vehicle $GV_1$ has reduced its speed to create a gap between the granting vehicle $GV_1$ and the vehicle $GV_n$ which is preceeding the granting vehicle $GV_1$. This change to the granting vehicle's path $p_{GV1}$, has allowed the requesting vehicle RV to accelerate and safely pass the granting vehicle $GV_1$. Simultaneously, the leading vehicle $GV_n$ may have changed its path by accelerating, thereby further increasing the gap between the granting vehicle $GV_1$ and the leading vehicle $GV_n$.

Figure 5D:
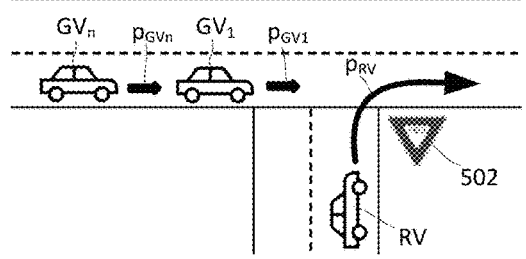
Figure 5D:
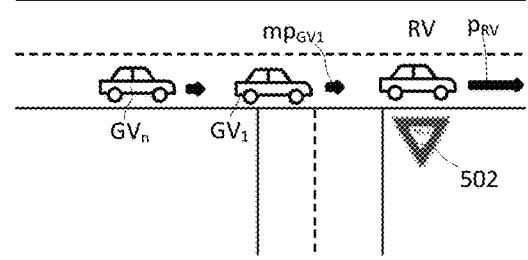

FIG. 5d illustrates a priority event taking place at an intersection. The "before" depiction shows the requesting vehicle RV and the granting vehicle $GV_1$ approaching an intersection. The requesting vehicle RV approaches the intersection on a road which, as dictated by a yield sign 502, has to yield to the granting vehicle $GV_1$. And another vehicle $GV_n$. In this situation, the requesting vehicle RV transmits a priority request to the granting vehicle $GV_1$.

The "after" depiction of FIG. 5d shows the result of the priority request having been granted: The granting vehicle $GV_1$ has modified its path $p_{GV1}$ to a modified path $mp_{GV1}$. More specifically, the granting vehicle $GV_1$ has reduced its speed and allowed the requesting vehicle RV to enter its path. The granting vehicle $GV_1$ has effectively surrendered its right of priority as established by the yield sign 502 to the requesting vehicle RV.

The terms "first," "second," "third," and so forth, as used in the claims, unless otherwise clear by context, is for clarity only and doesn't otherwise indicate or imply any order in time or any priority. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with the detection of objects using data derived from vehicle sensors) can employ various AI-based schemes for carrying out various embodiments thereof. Moreover, a classifier can be employed to determine a ranking or priority of detected objects. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired objects will be most impeding to the host vehicle and/or which of the acquired objects will be least impeding to the host vehicle, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "user," "driver," "customer," "operator" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method for requesting and granting priority between a host vehicle and other vehicles, comprising:
    1) monitoring a host vehicle's environment via host vehicle sensors for objects and drivable surfaces in proximity of the host vehicle while the host vehicle is traveling along a host vehicle path;
    2) periodically transmitting host vehicle status messages including a host vehicle identity and a host vehicle position;
    3) receiving status messages from other vehicles;
    4) requesting priority from other vehicles; and
    5) responding to other vehicles' priority requests,
    wherein requesting priority from other vehicles includes
        4a) evaluating data from the host vehicle sensors to detect an impeding vehicle which interferes with the host vehicle's path,
        4b) identifying the impeding vehicle by combining data contained in received vehicles status messages with data from the host vehicle sensors,
        4c) transmitting a host vehicle priority request including a host remuneration offer to the impeding vehicle, and
        4d) receiving an impeding vehicle response which grants or denies the host vehicle priority request,
    and wherein responding to other vehicles' priority requests includes
        5a) monitoring data from the host vehicle sensors for possible changes to the host vehicle path,
        5b) receiving a priority request including a request remuneration offer from a requesting vehicle,
        5c) granting or rejecting the received priority request,
        5d) transmitting a priority request response to the requesting vehicle, and
        5e) modifying the host vehicle path to be less impeding to the requesting vehicle if the received priority request was granted.

2. The method as in claim 1, wherein requesting priority from other vehicles further includes
    4e) generating a priority event record including an identity of the impeding vehicle;
    4f) storing the priority event record;
    4g) generating a remuneration record related to the priority event record, wherein the remuneration record includes
        a currency value of the host remuneration offer associated with the priority event record,
        an identity of the host vehicle as a debtor, and
        the identity of the impeding vehicle as a creditor; and
    wherein responding to other vehicles' priority requests further includes
    5f) generating a priority event record including an identity of the requesting vehicle;
    5g) storing the priority event record;
    5h) generating a remuneration record related to the priority event record, wherein the remuneration record includes
        a currency value of the request remuneration offer associated with the priority event record,
        an identity of the host vehicle as a creditor, and the identity of the requesting vehicle as a debtor.

3. The method as in claim 2, wherein the remuneration record is generated and settled in accordance with a cryptocurrency protocol.

4. The method as in claim 2, wherein the remuneration record is generated and settled using fiat money.

5. The method as in claim 1, wherein granting or rejecting the received priority request includes:
   5c1) presenting the priority request including the request remuneration offer through a user interface; and
   5c2) receiving a user response to the priority request through the user interface.

6. The method as in claim 1, wherein modifying the host vehicle path to be less impeding to the requesting vehicle includes presenting driving instructions to a driver of the host vehicle through a user interface.

7. The method as in claim 6, wherein the driving instructions include at least one of a change in speed, an absolute speed, a lane change, a heading change, and a turn maneuver.

8. The method as in claim 1, wherein modifying the host vehicle path to be less impeding to the requesting vehicle includes controlling a lateral and longitudinal motion of the host vehicle through a vehicle control interface.

9. The method as in claim 1, wherein requesting priority from other vehicles further includes:
   determining a desired host vehicle speed;
   determining a speed of the impeding vehicle; and
   determining the host remuneration as a function of the difference between the desired host vehicle speed and the speed of the impeding vehicle.

10. The method as in claim 1, wherein requesting priority from other vehicles further includes:
    determining an estimated time of arrival at a destination,
    determining an arrival time delay caused by the impeding vehicle, and
    determining the host remuneration as a function of the arrival time delay.

11. The method as in claim 1, wherein requesting priority from other vehicles further includes:
    identifying a second impeding vehicle which interferes with the host vehicle's path,
    transmitting a contingent host vehicle priority request including a contingent host remuneration offer to the second impeding vehicle,
    receiving a second impeding vehicle response which grants or denies the contingent host vehicle priority request, and
    transmitting the host vehicle priority request including the host remuneration offer to the impeding vehicle only if the contingent host vehicle priority request was granted by the second impeding vehicle.

12. The method as in claim 11, wherein the second impeding vehicle is further away from the host vehicle than the impeding vehicle.

13. A system for requesting and granting priority between a host vehicle and other vehicles, comprising:
    vehicle sensors configured to detect objects and drivable surfaces in proximity of the host vehicle while the host vehicle is traveling along a host vehicle path;
    a communication interface through which the host vehicle can communicate with other vehicles and with a central server;
    a memory configured to store instructions; and
    a processor, coupled to the memory, the communication interface, and the vehicle sensors, wherein responsive to executing the instructions, the processor is configured to perform operations to request priority from another vehicle, including
      monitoring data from the vehicle sensors to detect an impeding vehicle which interferes with the host vehicle's path,
      identifying the impeding vehicle,
      transmitting a host vehicle priority request including a host remuneration offer through the communication interface to the impeding vehicle, and
      receiving an impeding vehicle response which grants or denies the host vehicle priority request,
    and wherein responsive to executing the instructions, the processor is further configured to perform operations to grant priority to a requesting vehicle, including
      monitoring data received from the vehicle sensors for possible changes to the host vehicle path,
      receiving a priority request including a request remuneration offer through the communication interface from the requesting vehicle,
      deciding whether to grant or reject the received priority request,
      transmitting a priority request response to the requesting vehicle, and
      modifying the host vehicle path to be less impeding to the requesting vehicle if the received priority request was granted.

14. The system as in claim 13, wherein the processor is configured to perform further operations when the impeding vehicle grants the priority request, including:
    generating a priority event record including an identity of the impeding vehicle;
    storing the priority event record in the memory;
    generating a remuneration record related to the priority event record,
      wherein the remuneration record includes
        a currency value of the host remuneration offer associated with the priority event record,
        an identity of the host vehicle as a debtor, and
        the identity of the impeding vehicle as a creditor; and
    wherein the processor is configured to perform further operations when granting priority to a requesting vehicle, including:
    generating a priority event record including an identity of the requesting vehicle;
    storing the priority event record in the memory;
    generating a remuneration record related to the priority event record,
      wherein the remuneration record includes
        a currency value of the request remuneration offer associated with the priority event record,
        an identity of the host vehicle as a creditor, and
        the identity of the requesting vehicle as a debtor.

15. The system as in claim 13,
    wherein the central server comprises a database configured to store priority event records and remuneration records, and
    wherein the host vehicle wirelessly communicates the priority event record and the remuneration record to the central server.

16. The system as in claim 13,
    further comprising a user interface device coupled to the processor,
    wherein deciding whether to grant or reject the received priority request includes presenting the priority request including the request remuneration offer to a driver of the host vehicle and receiving input from the driver of the host vehicle.

17. The system as in claim 13,
wherein the host vehicle, through the communication interface, receives status messages from other vehicles, the status messages including an identity and a position of the other vehicles, and
wherein identifying the impeding vehicle includes combining data received from other vehicles' status messages with data from the vehicle sensors.

18. The system as in claim 13, further comprising
an ultrasound transmitter configured to periodically broadcast an ultrasonic beacon, the ultrasonic beacon being modulated to include identity information and a timestamp,
a first ultrasound receiver, configured to received ultrasonic beacons, and
a second ultrasound receiver, configured to received ultrasonic beacons, the second ultrasound receiver being spatially separated from the first ultrasound receiver,
wherein the processor, responsive to executing the instructions, is configured to determine
a first run-time of the ultrasonic beacon from a point of origin to the first ultrasound receiver,
a second run-time of the ultrasonic beacon from the point or origin to the second ultrasound receiver, and
a position of the point of origin of the ultrasonic beacon.

19. The system as in claim 13,
further comprising a vehicle control interface operatively connected to the processor and capable of controlling a lateral and longitudinal motion of the host vehicle,
wherein modifying the host vehicle path is affected by the processor through the vehicle control interface.

* * * * *